US012381363B2

(12) United States Patent
Kobayashi et al.

(10) Patent No.: US 12,381,363 B2
(45) Date of Patent: Aug. 5, 2025

(54) CONTACT DEVICE WITH MAGNETS DIRECTING ARC AWAY FROM THE CENTRAL SPACE

(71) Applicant: OMRON Corporation, Kyoto (JP)

(72) Inventors: Minoru Kobayashi, Kyoto (JP); Shuichi Itoda, Kyoto (JP); Nanako Hinokitani, Kyoto (JP); Yuta Motomura, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 301 days.

(21) Appl. No.: 18/039,490

(22) PCT Filed: Sep. 14, 2021

(86) PCT No.: PCT/JP2021/033627

§ 371 (c)(1),
(2) Date: May 31, 2023

(87) PCT Pub. No.: WO2022/130711

PCT Pub. Date: Jun. 23, 2022

(65) Prior Publication Data

US 2023/0420893 A1 Dec. 28, 2023

(30) Foreign Application Priority Data

Dec. 15, 2020 (JP) ................................ 2020-207338

(51) Int. Cl.
*H01R 13/713* (2006.01)
*H01H 9/44* (2006.01)
*H01R 27/00* (2006.01)

(52) U.S. Cl.
CPC ............ *H01R 13/713* (2013.01); *H01H 9/44* (2013.01); *H01R 27/00* (2013.01)

(58) Field of Classification Search
CPC ........ H01R 13/713; H01R 9/44; H01R 27/00; H01R 13/66; H01R 9/443
See application file for complete search history.

(56) References Cited

U.S. PATENT DOCUMENTS 11,621,136 B2 * 4/2023 Mori ........................ H01H 9/30 335/185
2013/0037518 A1 2/2013 Iwamoto et al.
(Continued)

FOREIGN PATENT DOCUMENTS

CN 103038847 A * 4/2013 ............ H01H 33/20
CN 107533936 A * 1/2018 ............ H01H 50/04
(Continued)

OTHER PUBLICATIONS

The International Search Report of International Application No. PCT/JP2021/033627 issued on Nov. 30, 2021.
(Continued)

*Primary Examiner* — Travis S Chambers
(74) *Attorney, Agent, or Firm* — SHINJYU GLOBAL IP

(57) ABSTRACT

A first fixed terminal extends in a first direction. A second fixed terminal extends in the first direction and is disposed apart from the first fixed terminal in a second direction perpendicular to the first direction. A first magnet generates a magnetic field that applies a first Lorentz force in a first oblique direction to an arc generated at a first fixed contact and a first movable contact. The first oblique direction is a direction that is inclined with respect to the first direction and oriented away from the second fixed terminal. A second magnet generates a magnetic field that applies a second Lorentz force in a second oblique direction to an arc generated at a second fixed contact and a second movable
(Continued)

contact. The second oblique direction is a direction that is inclined with respect to the first direction and oriented away from the first fixed terminal.

6 Claims, 17 Drawing Sheets

(56) References Cited

U.S. PATENT DOCUMENTS

| | | | |
|---|---|---|---|
| 2016/0012991 A1 | 1/2016 | Lee | |
| 2022/0028639 A1* | 1/2022 | Sullivan | H01H 77/06 |
| 2022/0415596 A1 | 12/2022 | Hotta et al. | |
| 2023/0411886 A1* | 12/2023 | Kobayashi | H01R 13/7032 |

FOREIGN PATENT DOCUMENTS

| | | | |
|---|---|---|---|
| CN | 109360755 | A | 2/2019 |
| JP | 2008-226547 | A | 9/2008 |
| JP | 2012-142195 | A | 7/2012 |
| JP | 2013-41690 | A | 2/2013 |
| JP | 2016-21394 | A | 2/2016 |
| WO | 2021/149361 | A1 | 7/2021 |

OTHER PUBLICATIONS

The Written Opinion of the International Searching Authority of International Application No. PCT/JP2021/033627 issued on Nov. 30, 2021.

* cited by examiner

CONTACT DEVICE WITH MAGNETS DIRECTING ARC AWAY FROM THE CENTRAL SPACE

CROSS-REFERENCE TO RELATED APPLICATION

This application is the U.S. National Phase of International Application No. PCT/JP2021/033627, filed on Sep. 14, 2021. This application claims priority to Japanese Patent Application No. 2020-207338, filed Dec. 15, 2020. The contents of those applications are incorporated by reference herein in their entireties.

FIELD

The present invention relates to a contact device and a power outlet.

BACKGROUND

Some contact devices have a so-called double-break contact structure. The double-break contact structure includes a first fixed terminal, a second fixed terminal, a first movable piece, and a second movable piece. The first fixed terminal and the second fixed terminal are disposed apart from each other. A first fixed contact is connected to the first fixed terminal. A second fixed contact is connected to the second fixed terminal. The first movable piece faces the first fixed terminal. A first movable contact is connected to the first movable piece. The second movable piece faces the second fixed terminal. A second movable contact is connected to the second movable piece.

In the contact device described above, the contacts are opened and closed by the movement of the first movable piece and the second movable piece. For example, by moving the first movable piece and the second movable piece in a predetermined direction, the first movable contact contacts the first fixed contact and the second movable contact contacts the second fixed contact. By moving the first movable piece and the second movable piece in a direction opposite to the predetermined direction, the first movable contact separates from the first fixed contact and the second movable contact separates from the second fixed contact.

On the other hand, in the contact device, arcing is likely to occur at the contact when a high voltage and a high current is interrupted. Conventionally, in order to prevent damage to the contact device due to the arc, a technique of extending the arc using a magnet is known. In the technique, a magnetic field is generated at the contact by arranging a magnet in the contact device. Then, the arc is elongated by applying the Lorentz force due to the magnetic field to the arc. The arc is thereby quickly extinguished. For example, in Japanese Patent Application Publication No. 2012-142195, a first magnet is disposed above the first fixed contact. A second magnet is disposed above the second fixed contact.

SUMMARY

If a large space for elongating the arc can be provided in the contact device, the arc can be effectively extinguished by sufficiently elongating the arc. However, in that case, the contact device is enlarged.

On the other hand, in the above contact device, the first fixed terminal and the second fixed terminal are disposed apart from each other with a distance for maintaining insulation. Therefore, a space (hereinafter referred to as "central space") is provided between the first fixed terminal and the second fixed terminal. When an arc occurs, the air in the central space is rapidly warmed by the heat of the arc and thereby a temperature difference with the surroundings occurs. Therefore, an airflow is generated that flows from the periphery to the central space. This airflow may cause a phenomenon in which the arc elongated by the Lorentz force moves toward the central space. In that case, a short circuit may occur between the first fixed terminal and the second fixed terminal. An object of the present invention is to suppress an increase in size of a contact device and to suppress an occurrence of a short circuit between terminals in the contact device having a double-break contact structure.

A contact device according to an aspect of the present invention includes a first fixed terminal, a first fixed contact, a second fixed terminal, a second fixed contact, a first movable contact, a first movable piece, a second movable contact, a second movable piece, a moving mechanism, a first magnet, and a second magnet. The first fixed terminal extends in a first direction. The first fixed contact is connected to the first fixed terminal. The second fixed terminal extends in the first direction and is disposed apart from the first fixed terminal in a second direction perpendicular to the first direction. The second fixed contact is connected to the second fixed terminal. The first movable contact faces the first fixed contact. The first movable piece is connected to the first movable contact. The second movable contact faces the second fixed contact. The second movable piece is connected to the second movable contact. The second movable piece is disposed apart from the first movable piece in the second direction. The moving mechanism moves the first movable piece and the second movable piece. The first magnet generates a magnetic field that applies a first Lorentz force in a first oblique direction to an arc generated at the first fixed contact and the first movable contact. The first oblique direction is a direction that is inclined with respect to the first direction and oriented away from the second fixed terminal. The second magnet generates a magnetic field that applies a second Lorentz force in a second oblique direction to an arc generated at the second fixed contact and the second movable contact. The second oblique direction is a direction that is inclined with respect to the first direction and oriented away from the first fixed terminal.

In the contact device according to the present aspect, the first Lorentz force in the first oblique direction acts on the arc generated between the first fixed contact and the first movable contact by the first magnet. Also, the second Lorentz force in the second oblique direction acts on the arc generated between the second fixed contact and the second movable contact by the second magnet. Therefore, the Lorentz force acts on each arc in a direction away from the space between the first fixed terminal and the second fixed terminal (hereinafter referred to as the central space). Therefore, even if an airflow flowing toward the central space is generated due to the temperature difference due to the heat of the arc, the movement of the arc toward the central space is suppressed. This suppresses the occurrence of a short circuit between the terminals. Also, the first oblique direction and the second oblique direction are inclined with respect to the first direction. Therefore, compared to the case where the first and second Lorentz forces act in directions perpendicular to the first direction, the arc can be elongated using a space along the first fixed contact and a space along the second fixed contact. As a result, the arc can be extinguished effectively and an increase in size of the contact device can be suppressed.

The contact device may further include a partition wall. The partition wall may be disposed between the first fixed terminal and the second fixed terminal. In this case, the partition wall further suppresses the occurrence of a short circuit between the The first movable contact may be disposed above the first fixed contact. The second movable contact may be disposed above the second fixed contact. The moving mechanism may be disposed above the partition wall. In this case, the moving mechanism and the partition wall are disposed compactly. In addition, with the moving mechanism, even if a space in which the first fixed terminal is disposed and a space in which the second fixed terminal is disposed are not completely blocked by the partition wall, the occurrence of a short circuit between terminals is suppressed by the above-described first and second magnets.

The contact device may further include a case. The case may accommodate the first fixed terminal and the second fixed terminal. The case may include an air hole. The air hole may be disposed facing the central space. In this case, warm air by the arc is released to the outside through the air hole. This restrains the arc from moving toward the central space.

The first magnet may have a first axis connecting north and south poles of the first magnet. The first axis may be inclined with respect to the first direction and the second direction. The second magnet may have a second axis connecting the north and south poles of the second magnet. The second axis may be symmetrically inclined with respect to the first axis. In this case, by arranging the first magnet as described above, a magnetic field for generating the first Lorentz force in the first oblique direction can be generated. By arranging the second magnet as described above, a magnetic field for generating the second Lorentz force in the second oblique direction can be generated.

A power outlet according to another aspect of the present invention includes the above-described contact device, a socket, a first connection terminal, and a second connection terminal. The socket includes a first insertion port and a second insertion port. The first connection terminal is disposed in the first insertion port and connected to the first movable piece. The second connection terminal is connected to the second insertion port and connected to the second movable piece. In the power outlet according to the present aspect, even if an airflow flowing toward the central space is generated due to the temperature difference due to the heat of the arc, the movement of the arc toward the central space is suppressed. This suppresses the occurrence of a short circuit between the terminals.

DETAILED DESCRIPTION

Figure 1:
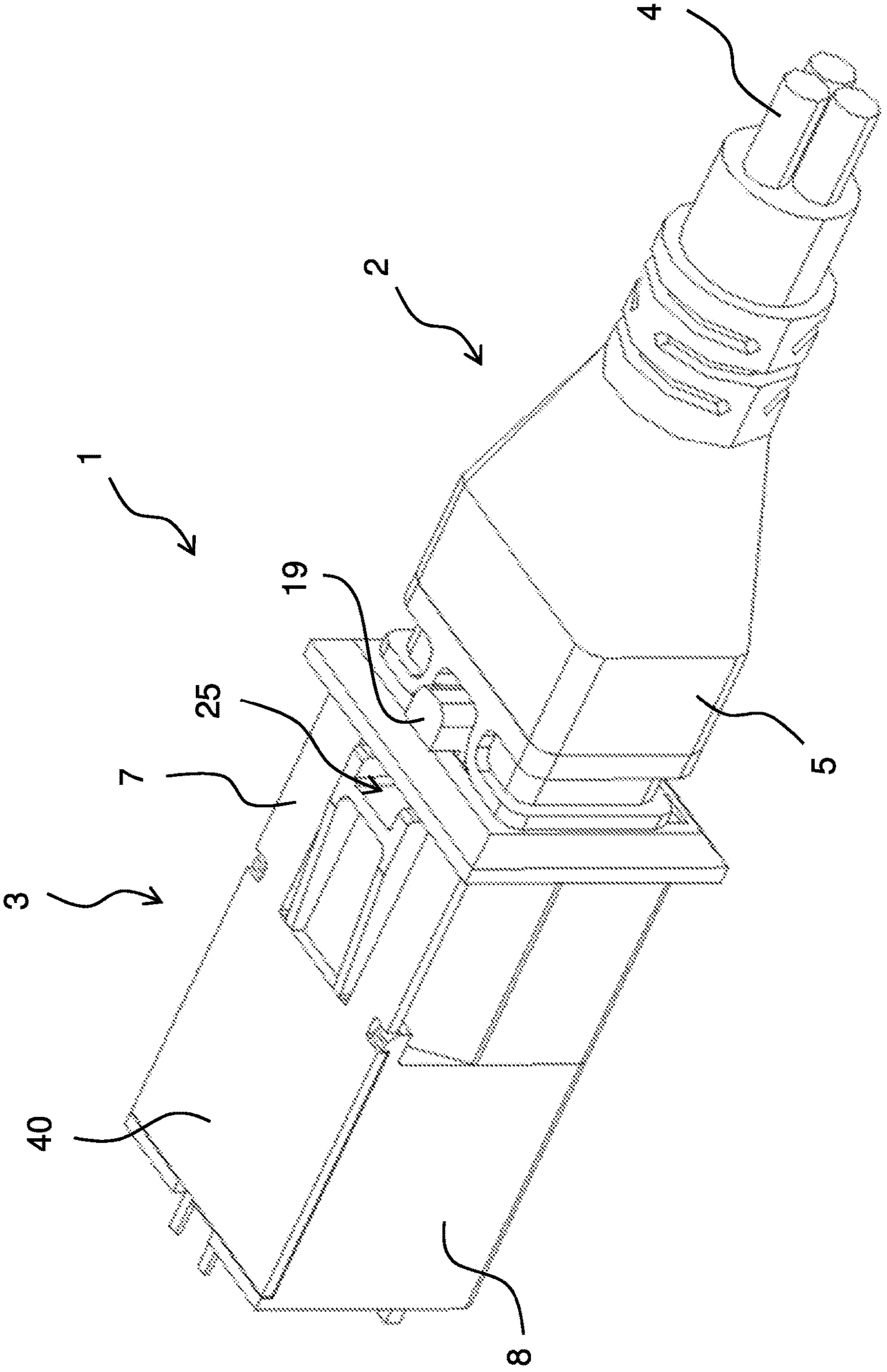
FIG. 1 is a perspective view of a power connector according to an embodiment.
Figure 2:
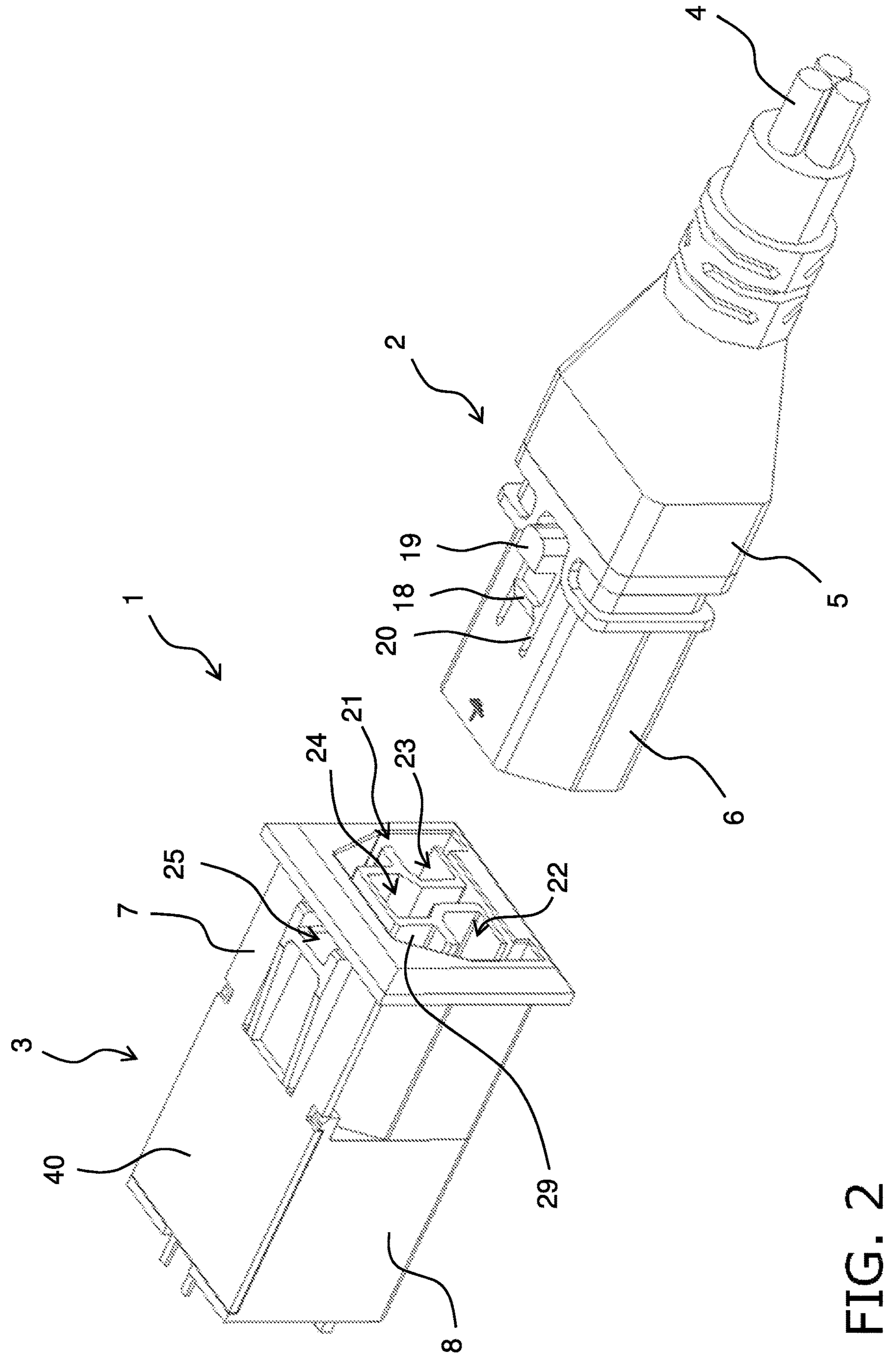
FIG. 2 is an exploded view of the power connector.

Hereinafter, a contact device according to an embodiment and a power connector equipped with the contact device will be described with reference to the drawings. FIG. 1 is a perspective view of a power connector 1 according to an embodiment. FIG. 2 is an exploded view of the power connector 1. The power connector 1 is used to connect a power source and an electrical device. The power connector 1 can be used, for example, for high-current direct current. As shown in FIGS. 1 and 2, the power connector 1 includes an electric plug 2 and a power outlet 3. The electric plug 2 is insertable into the power outlet 3.

Figure 3:
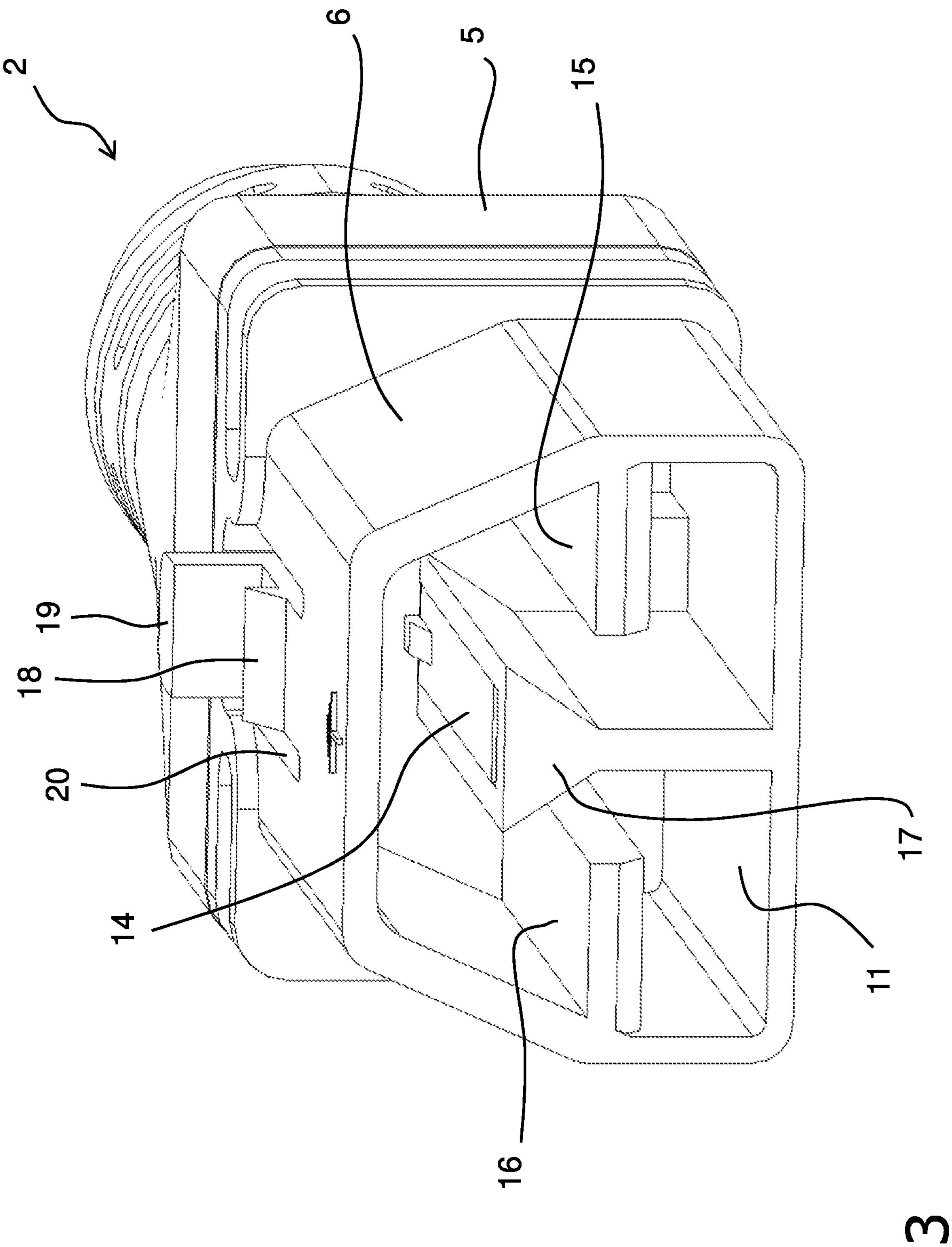
FIG. 3 is a perspective view of an electric plug.
Figure 4:
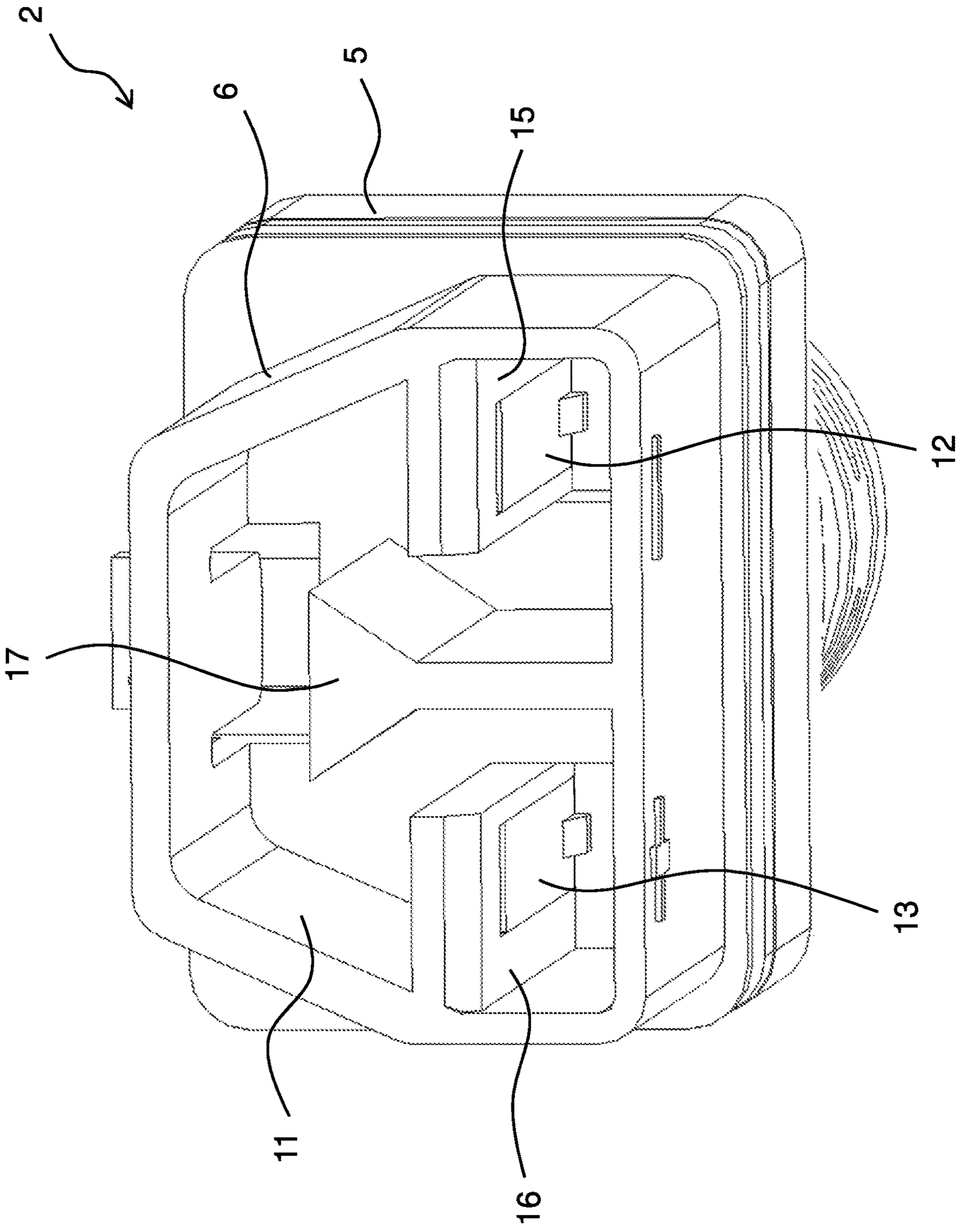
FIG. 4 is a perspective view of the electric plug.

The electric plug 2 is connected to an electrical device. The electric plug 2 includes an electric cable 4, a plug cover 5, and an insert 6. The electric cable 4 extends from the plug cover 5. The insert 6 projects from the plug cover 5. FIGS. 3 and 4 are perspective views of the electric plug 2. As shown in FIGS. 3 and 4, the insert 6 includes a plug hole 11. The plug hole 11 has a shape recessed from the tip of the insert 6. The electric plug 2 includes a first plug terminal 12, a second plug terminal 13, a plug ground terminal 14, a first terminal support portion 15, a second terminal support portion 16, and a pressing portion 17. The first plug terminal 12, the second plug terminal 13, the plug ground terminal 14, the first terminal support portion 15, the second terminal support portion 16, and the pressing portion 17 are disposed in the plug hole 11.

In the present embodiment, a direction in which the electric plug 2 is inserted into and pulled out of the power outlet 3 is defined as a front-rear direction (a first direction). In particular, a direction from the power outlet 3 to the electric plug 2 is defined as forward, and the opposite direction is defined rearward. A direction in which the first plug terminals 12 and the second plug terminals 13 are aligned is defined as a left-right direction (a second direction). A direction perpendicular to the front-rear direction and the left-right direction is defined as an up-down direction. In particular, a direction from the first plug terminal 12 and the second plug terminal 13 to the plug ground terminal 14 is defined as upward, and the opposite direction is defined as downward. However, these directions are used for convenience of explanation, and do not limit the directions in which the power connector 1 is used.

The first plug terminal 12, the second plug terminal 13, and the plug ground terminal 14 are connected to the electric cable 4. The first plug terminal 12, the second plug terminal 13, and the plug ground terminal 14 are made of a conductive material such as copper. The first terminal support portion 15, the second terminal support portion 16, and the pressing portion 17 extend in the front-rear direction from the plug cover 5. The first terminal support portion 15 extends along the first plug terminal 12. The first terminal support portion 15 is located above the first plug terminal 12. The first terminal support portion 15 supports the first plug terminal 12. The second terminal support portion 16 extends along the second plug terminal 13. The second terminal support portion 16 is located above the second plug terminal 13. The second terminal support portion 16 supports the second plug terminals 13. The first terminal support portion 15 and the second terminal support portion 16 are disposed apart from each other in the left-right direction.

The plug ground terminal 14 is disposed between the first plug terminal 12 and the second plug terminal 13 in the left-right direction. The plug ground terminal 14 is disposed above the first plug terminal 12 and the second plug terminal 13. The pressing portion 17 extends along the plug ground terminal 14. The pressing portion 17 is located below the plug ground terminal 14. The pressing portion 17 supports the plug ground terminal 14.

As shown in FIG. 2, the power outlet 3 includes a socket 7 and a case 8. The socket 7 extends in the front-rear direction. The socket 7 includes an insertion port 21. The insert 6 of the electric plug 2 is configured to be inserted into the insertion port 21. The insertion port 21 includes a first insertion port 22, a second insertion port 23, and a third insertion port 24. The first plug terminal 12 and the first terminal support portion are configured to be inserted into the first insertion port 22. The second plug terminal 13 and the second terminal support portion 16 are configured to be inserted into the second insertion port 23. The plug ground terminal 14 and the pressing portion 17 are configured to be inserted into the third insertion port 24.

The insert 6 of the electric plug 2 includes a protrusion 18 and a button 19. A slit 20 is provided around the protrusion 18 and the button 19. Thereby, the protrusion 18 and the button 19 are configured to move in the up-down direction. A hole 25 is provided in the upper surface of the socket 7. When the insert 6 is inserted into the insertion port 21 of the socket 7, the protrusion 18 is engaged in the hole 25. Thereby, the electric plug 2 is prevented from coming out of the socket 7. A user presses the button 19 to unlock the protrusion 18 from the hole 25. Thereby, the electric plug 2 can be pulled out from the socket 7.

Figure 5:
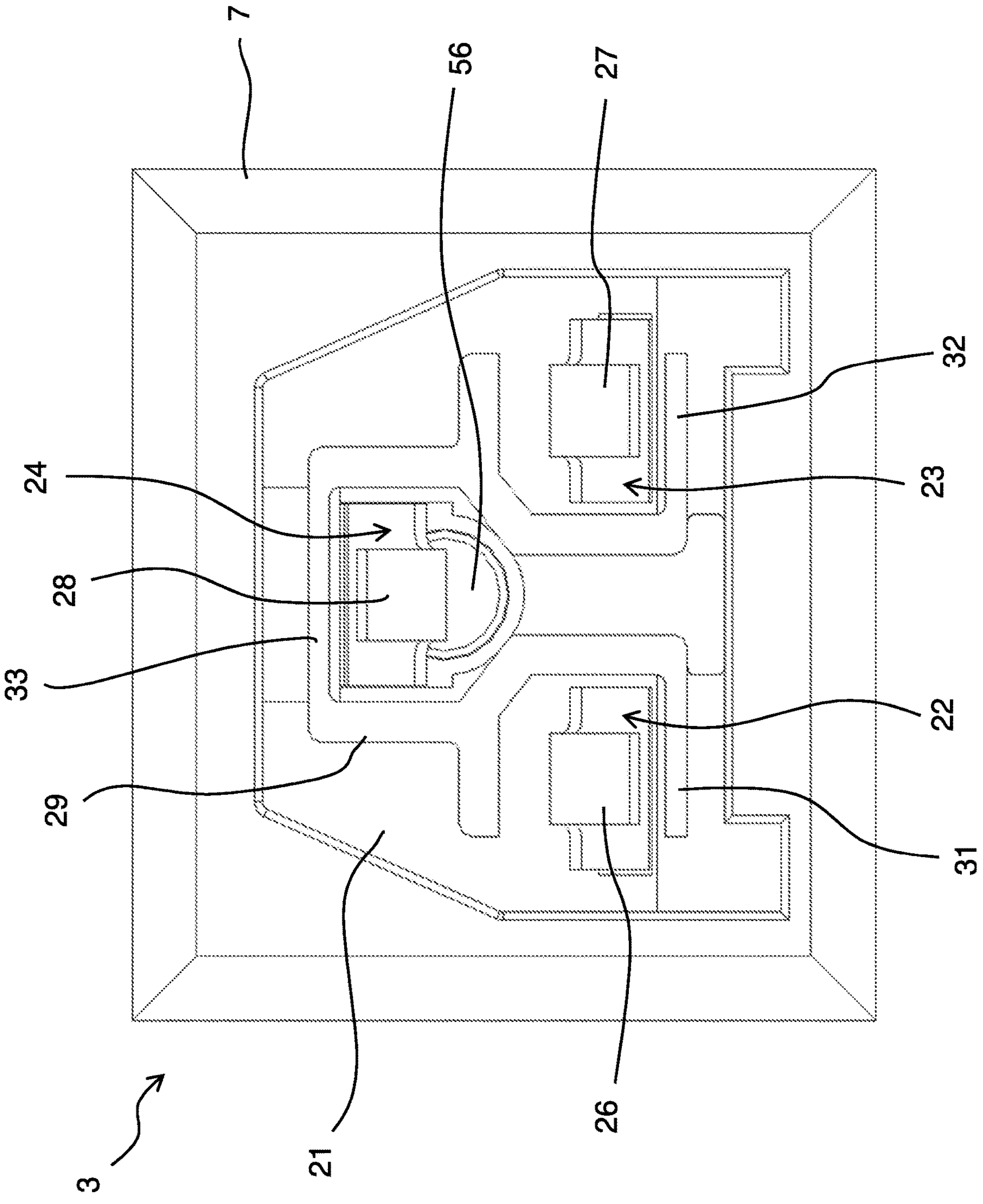
FIG. 5 is a front view of an insertion port of a power outlet.

FIG. 5 is a front view of the insertion port 21. As shown in FIG. 5, the power outlet 3 includes a first connection terminal 26, a second connection terminal 27, and a socket ground terminal 28. The first connection terminal 26, the second connection terminal 27, and the socket ground terminal 28 are made of a conductive material such as copper. The first connection terminal 26 is disposed in the first insertion port 22. The second connection terminal 27 is disposed in the second insertion port 23. The socket ground terminal 28 is disposed in the third insertion port 24.

The Socket 7 includes an inner wall 29. The inner wall 29 is disposed in the insertion port 21. The inner wall 29 extends in the front-rear direction. The first insertion port 22, the second insertion port 23, and the third insertion port 24 are partitioned from each other by the inner wall 29. The inner wall 29 includes a first support portion 31, a second support portion 32, and a third support portion 33. The first support portion 31 is disposed below the first connection terminal 26. The first support portion 31 extends along the first connection terminal 26. The second support portion 32 is disposed below the second connection terminal 27. The second support portion 32 extends along the second connection terminal 27. The third support portion 33 is disposed above the socket ground terminal 28. The third support portion 33 extends along the socket ground terminal 28.

Figure 6:
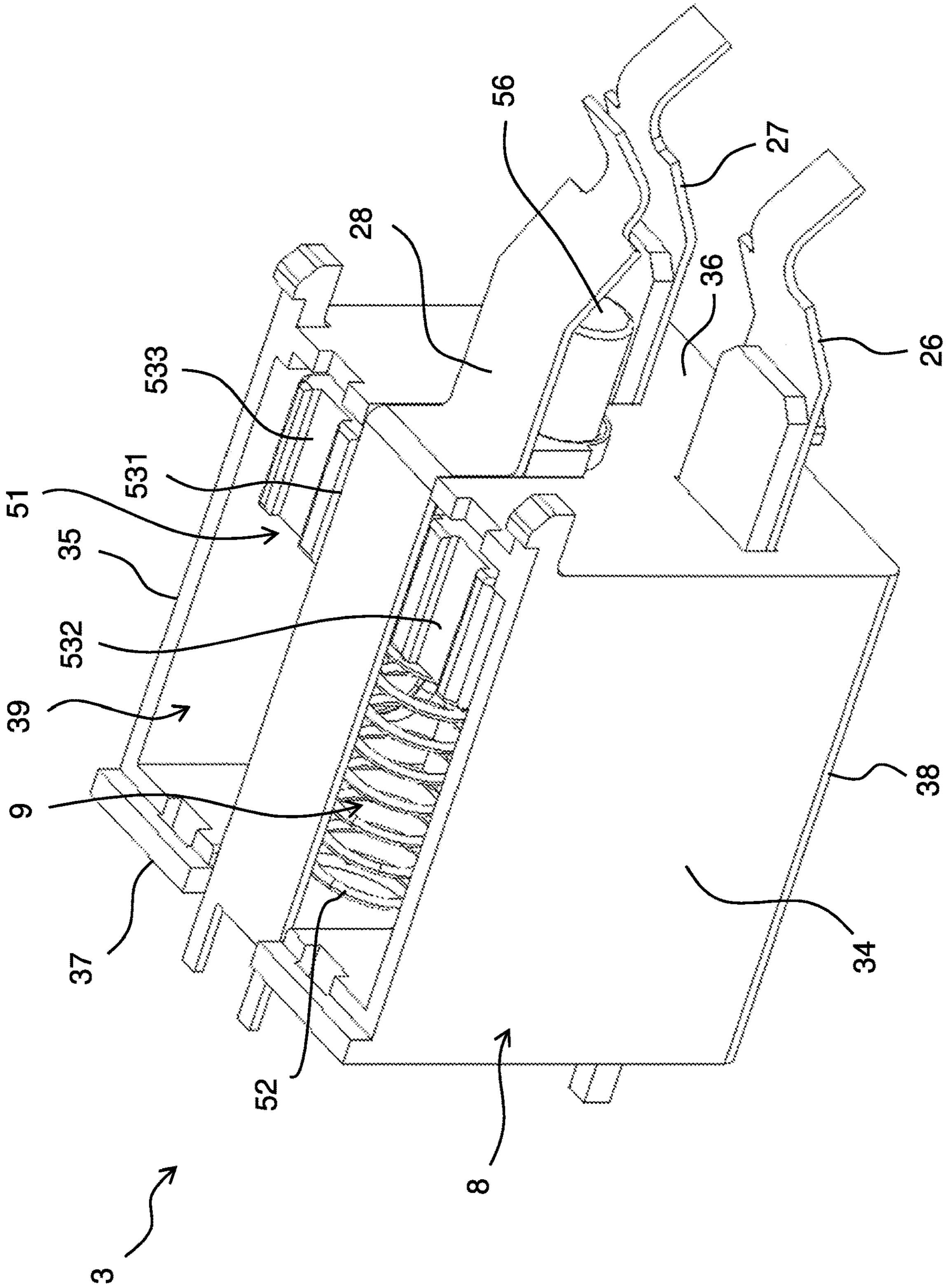
FIG. 6 is a perspective view of the power outlet with a socket removed.

FIG. 6 is a perspective view of the power outlet 3 with the socket 7 removed. As shown in FIG. 6, the first connection terminal 26, the second connection terminal 27, and the socket ground terminal 28 extend forward from the case 8. A rear end of the first connection terminal 26 has a curved shape. A rear end of the second connection terminal 27 has a curved shape. A rear end of the socket ground terminal 28 has a curved shape.

The case 8 includes a first side surface 34, a second side surface 35, a front surface 36, a rear surface 37, and a bottom surface 38. The first side surface 34 and the second side surface 35 are separated from each other in the left-right direction. The front surface 36 and the rear surface 37 are separated from each other in the front-rear direction. The front surface 36 partitions the inside of the socket 7 and the inside of the case 8. The first connection terminal 26, the second connection terminal 27, and the socket ground terminal 28 protrude forward from the rear surface 37. An opening 39 is provided on an upper surface of the case 8. The opening 39 is closed by a lid 40 extending from socket 7.

Figure 7:
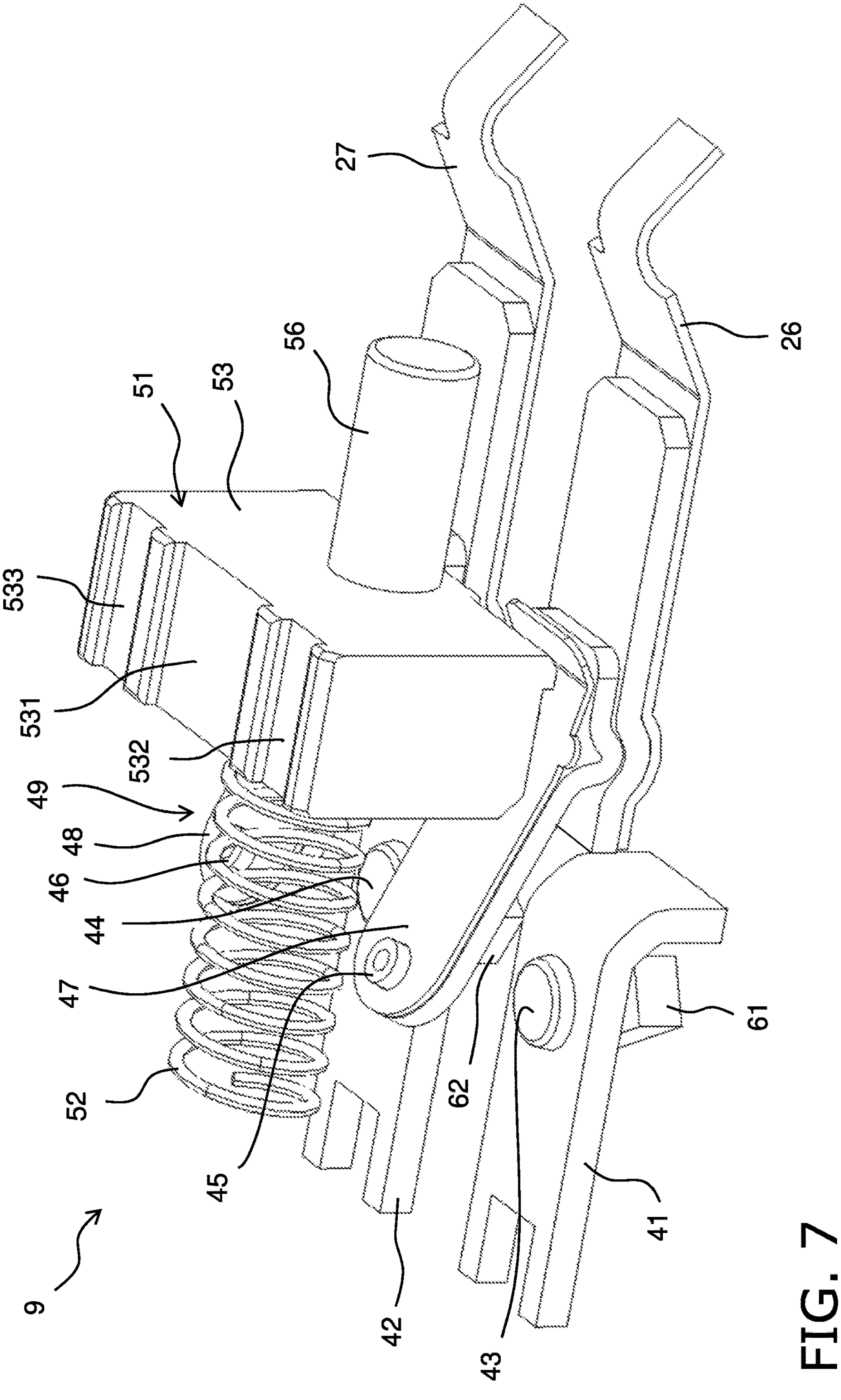
FIG. 7 is a perspective view of a contact device.
Figure 8:
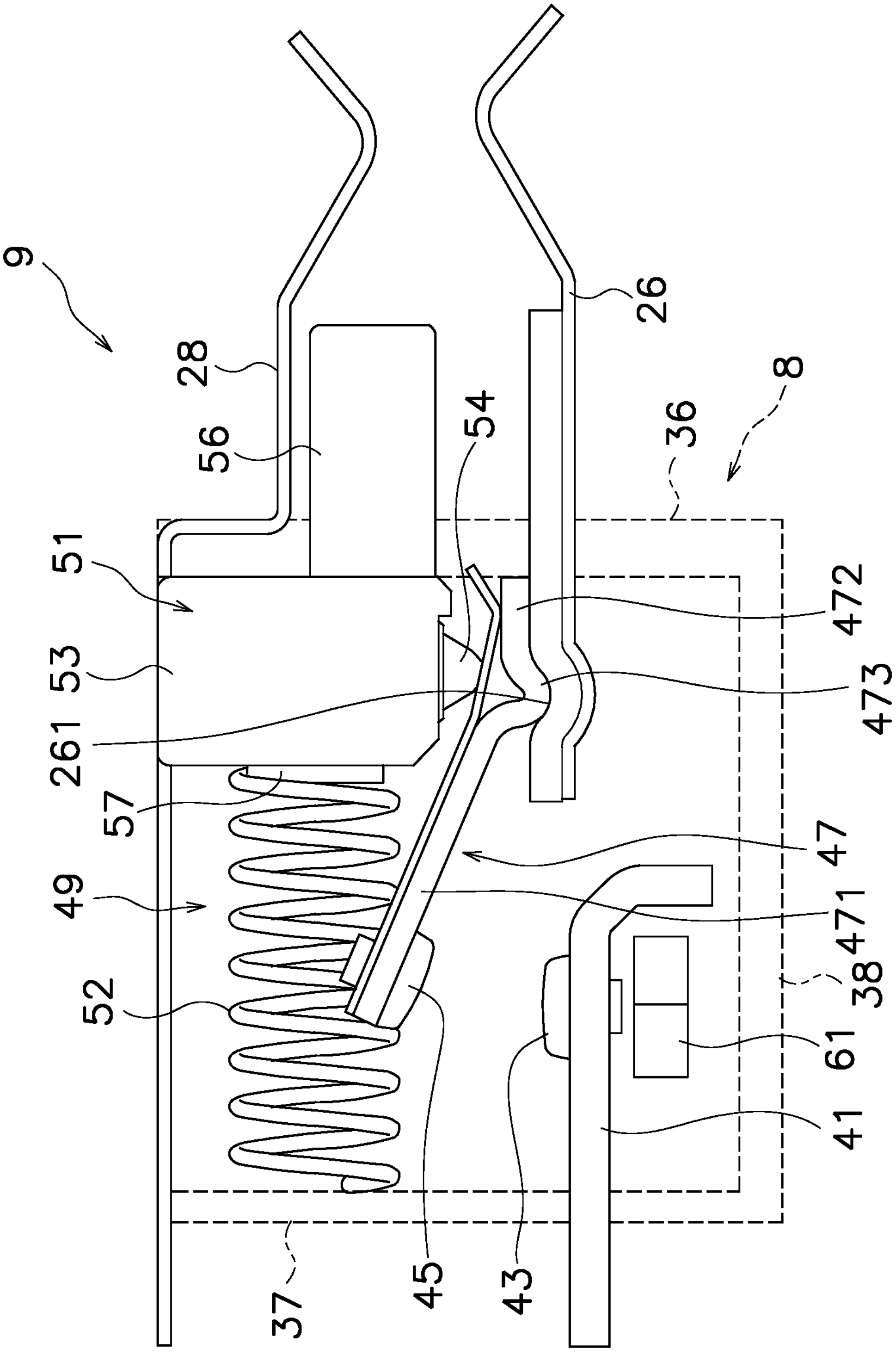
FIG. 8 is a side view of the contact device.

The power outlet 3 includes a contact device 9. The contact device 9 is disposed in the case 8. FIG. 7 is a perspective view of the contact device 9. FIG. 8 is a side view of the contact device 9. The contact device 9 includes a first fixed terminal 41, a second fixed terminal 42, a first fixed contact 43, a second fixed contact 44, a first movable contact 45, a second movable contact 46, a first movable piece 47, a second movable piece 48, and a moving mechanism 49. The first fixed terminal 41 and the second fixed terminal 42 extend in the front-rear direction. The second fixed terminal 42 is disposed apart from the first fixed terminal 41 in the left-right direction. The first fixed contact 43 is connected to the first fixed terminal 41. The second fixed contact 44 is connected to the second fixed terminal 42. The first fixed terminal 41 and the second fixed terminal 42 are made of a conductive material such as copper.

The first movable contact 45 is disposed above the first fixed contact 43. The first movable contact 45 is disposed to face the first fixed contact 43. The second movable contact 46 is disposed above the second fixed contact 44. The second movable contact 46 is disposed to face the second fixed contact 44. The first and second fixed contacts 43 and 44 and the first and second movable contacts 45 and 46 are made of a contact material such as copper alloy or silver alloy.

The first movable piece 47 is connected to the first movable contact 45. The first movable piece 47 extends in the front-rear direction. The first movable piece 47 is disposed above the first connection terminal 26 and the first fixed terminal 41. Specifically, as shown in FIG. 8, the first movable piece 47 includes a first tip portion 471, a first base portion 472, and a first fulcrum 473. The first movable contact 45 is connected to the first tip portion 471. The first tip portion 471 is disposed above the first fixed terminal 41. The first base portion 472 is located behind the first tip portion 471. The first base portion 472 is disposed above the first connection terminal 26. The first fulcrum 473 is disposed between the first tip portion 471 and the first base portion 472. The first fulcrum 473 is connected to the first tip portion 471 and the first base portion 472. The first fulcrum 473 has a downwardly convex curved shape. The first connection terminal 26 includes a first receiving portion 261. The first receiving portion 261 has a downwardly recessed shape. The first receiving portion 261 supports the first fulcrum 473. The first movable piece 47 is swingable around the first fulcrum 473.

Figure 9:
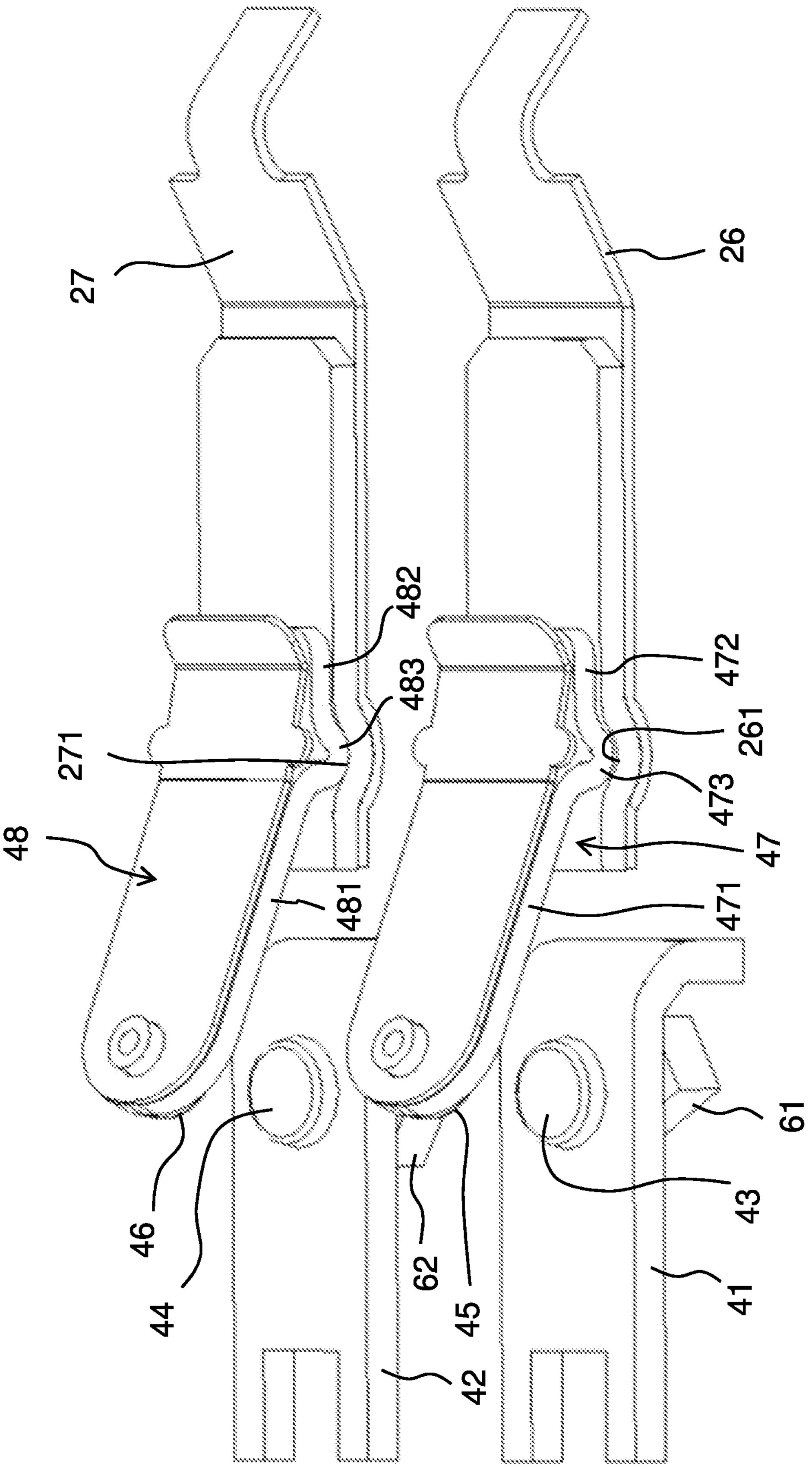
FIG. 9 is a perspective view of the contact device with a moving mechanism omitted.

FIG. 9 is a perspective view of the contact device 9 with the moving mechanism 49 omitted for clarity. As shown in FIG. 9, the second movable piece 48 is disposed apart from the first movable piece 47 in the left-right direction. The second movable piece 48 is connected to the second movable contact 46. The second movable piece 48 extends in the front-rear direction. The second movable piece 48 is disposed above the second connection terminal 27 and the second fixed terminal 42. The first movable piece 47 and the second movable piece 48 are made of a conductive material such as copper. The second movable piece 48 has a structure similar to that of the first movable piece 47. The second movable piece 48 includes a second tip portion 481, a second base portion 482, and a second fulcrum 483. The second tip portion 481, the second base portion 482, and the second fulcrum 483 have the same structures as the first tip portion 471, the first base portion 472, and the first fulcrum 473, respectively. The second connection terminal 27 includes a second receiving portion 271. The second receiving portion 271 has a structure similar to that of the first receiving portion 261. The second movable piece 48 is swingable around the second fulcrum 483.

Figure 10:
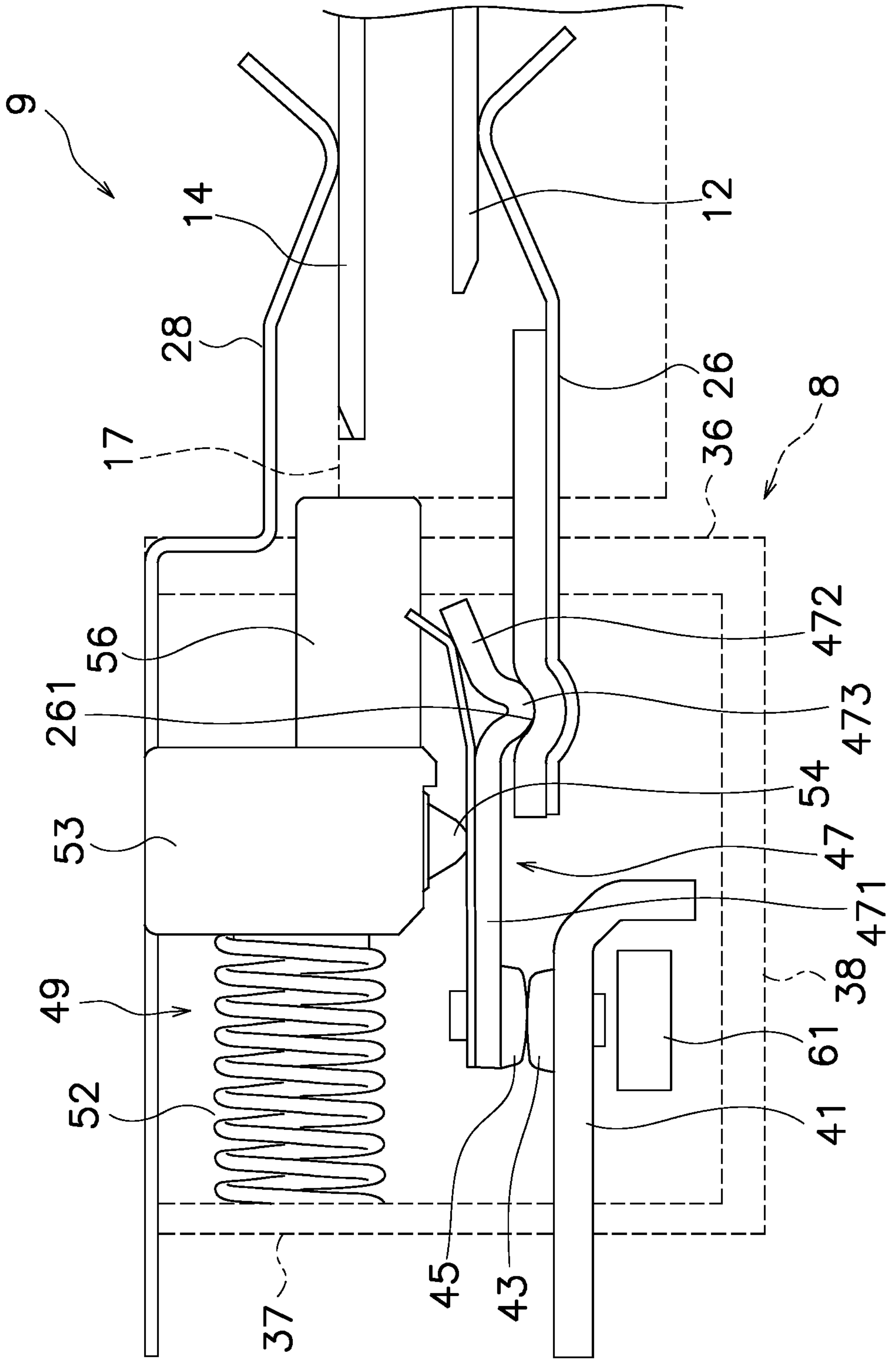
FIG. 10 is a side view of the contact device.

The moving mechanism 49 moves the first movable piece 47 and the second movable piece 48. The moving mechanism 49 is disposed above the first movable piece 47 and the second movable piece 48. As shown in FIG. 7, the moving mechanism 49 includes a plunger 51 and a return spring 52. The plunger 51 is movable in the front-rear direction. The plunger 51 is movable between a first position shown in FIG. 8 and a second position shown in FIG. 10. As shown in FIG. 8, the plunger 51 separates the first movable contact 45 from the first fixed contact 43 and separates the second movable contact 46 from the second fixed contact 44 at the first position. As shown in FIG. 10, the plunger 51 presses the first movable piece 47 toward the first fixed terminal 41 to make the first movable contact 45 move into contact with the first fixed contact 43 and presses the second movable piece 48 toward the second fixed terminal 42 to make the second movable contact 46 move into contact with the second fixed contact 44 at the second position.

Figure 11:
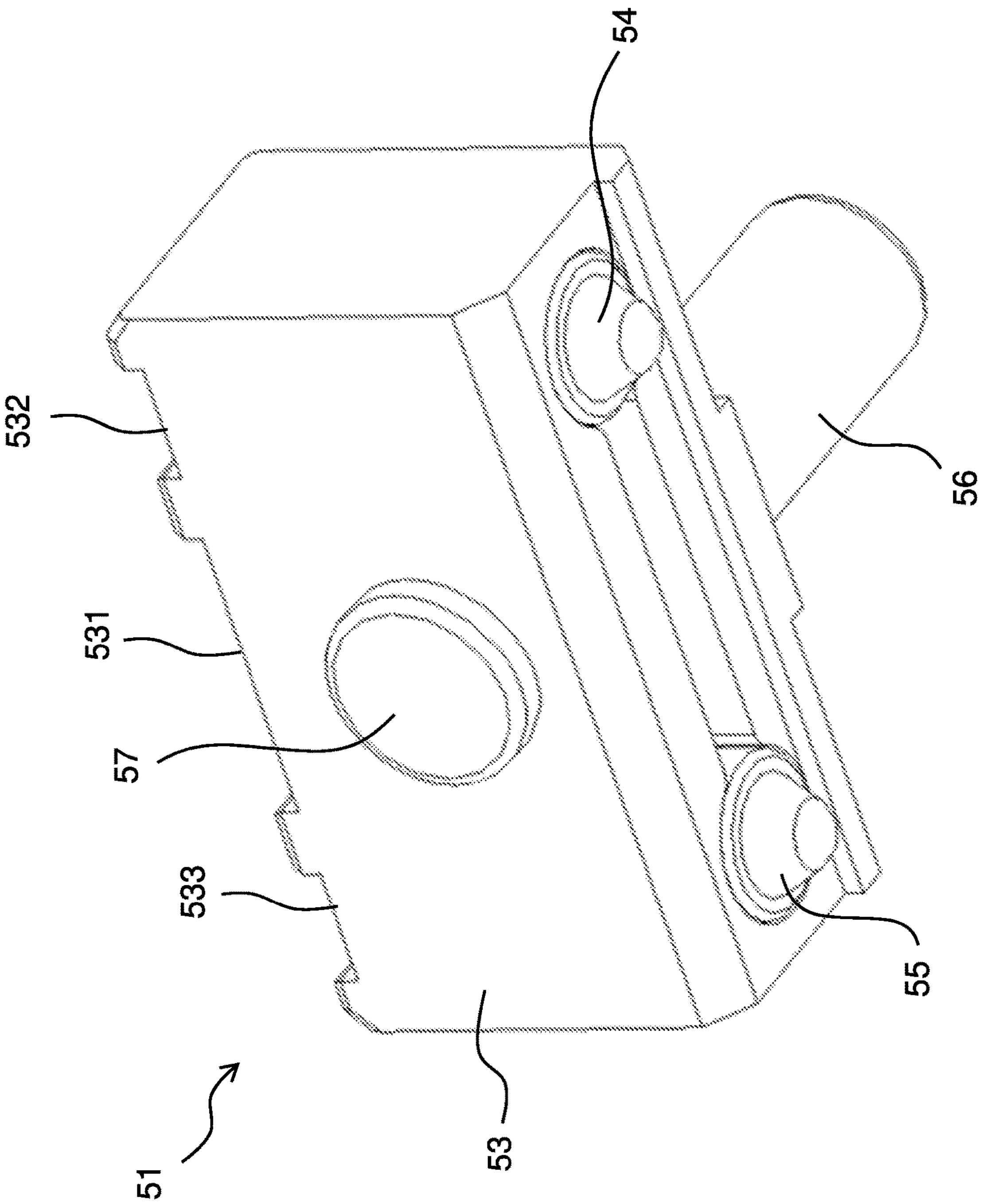
FIG. 11 is a perspective view of a plunger.

FIG. 11 is a perspective view of the plunger 51. As shown in FIG. 11, the plunger 51 includes a plunger body 53, a first pusher 54, a second pusher 55, a projection 56, and a spring mounting portion 57. The plunger body 53 is disposed above the first movable piece 47 and the second movable piece 48. As shown in FIG. 7, the plunger body 53 includes recessed grooves 531 to 533 on its upper surface. The recessed grooves 531 to 533 extend in the front-rear direction. As shown in FIG. 6, the socket ground terminal 28 is disposed in the groove 531. The lid 40 described above includes rail portions 401 and 402 (see FIG. 13). The rail portions 401 and 402 extend in the front-rear direction. The rail portions 401 and 402 are disposed in the grooves 532 and 533. The plunger body 53 moves in the front-rear direction along the rail portions 401 and 402.

As shown in FIG. 11, the first pusher 54 and the second pusher 55 protrude downward from the plunger body 53. The first pusher 54 and the second pusher 55 are disposed apart from each other in the left-right direction. The first pusher 54 protrudes from the plunger body 53 toward the first movable piece 47. The first pusher 54 presses the first movable piece 47. The second pusher 55 protrudes from the plunger body 53 toward the second movable piece 48. The second pusher 55 presses the second movable piece 48.

The projection 56 projects forward from the plunger body 53. As shown in FIG. 6, the projection 56 projects from the front surface 36 of the case 8. As shown in FIG. 5, the protrusion 56 faces the third insertion port 24. A portion of the projection 56 is located below the socket ground terminal 28. The projection 56 is pressed by the pressing portion 17 of the electric plug 2 inserted into the third insertion port 24. The plunger 51 thereby moves from the first position to the second position.

The spring mounting portion 57 protrudes rearward from the plunger body 53. The return spring 52 is attached to the spring mounting portion 57. The return spring 52 presses the plunger 51 toward the first position. That is, the return spring 52 pushes the plunger 51 forward. The return spring 52 is a coil spring. The return spring 52 is disposed between the plunger 51 and the rear surface 37 of the case 8. The return spring 52 is disposed between the first movable piece 47 and the second movable piece 48 in the left-right direction. The return spring 52 is disposed between the first fixed terminal 41 and the second fixed terminal 42 in the left-right direction.

Figure 12:
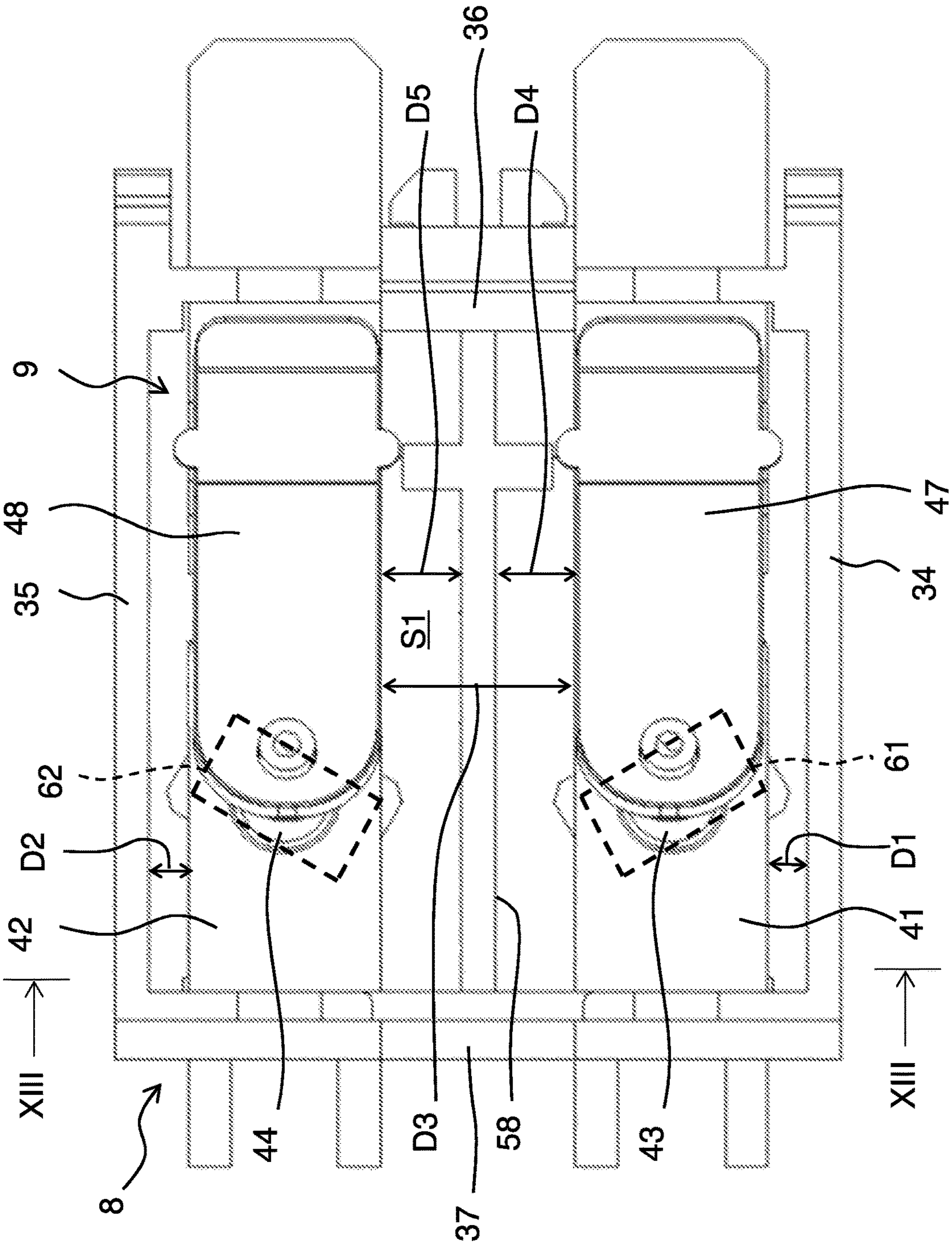
FIG. 12 is a top view of the contact device and a case with the moving mechanism omitted.
Figure 13:
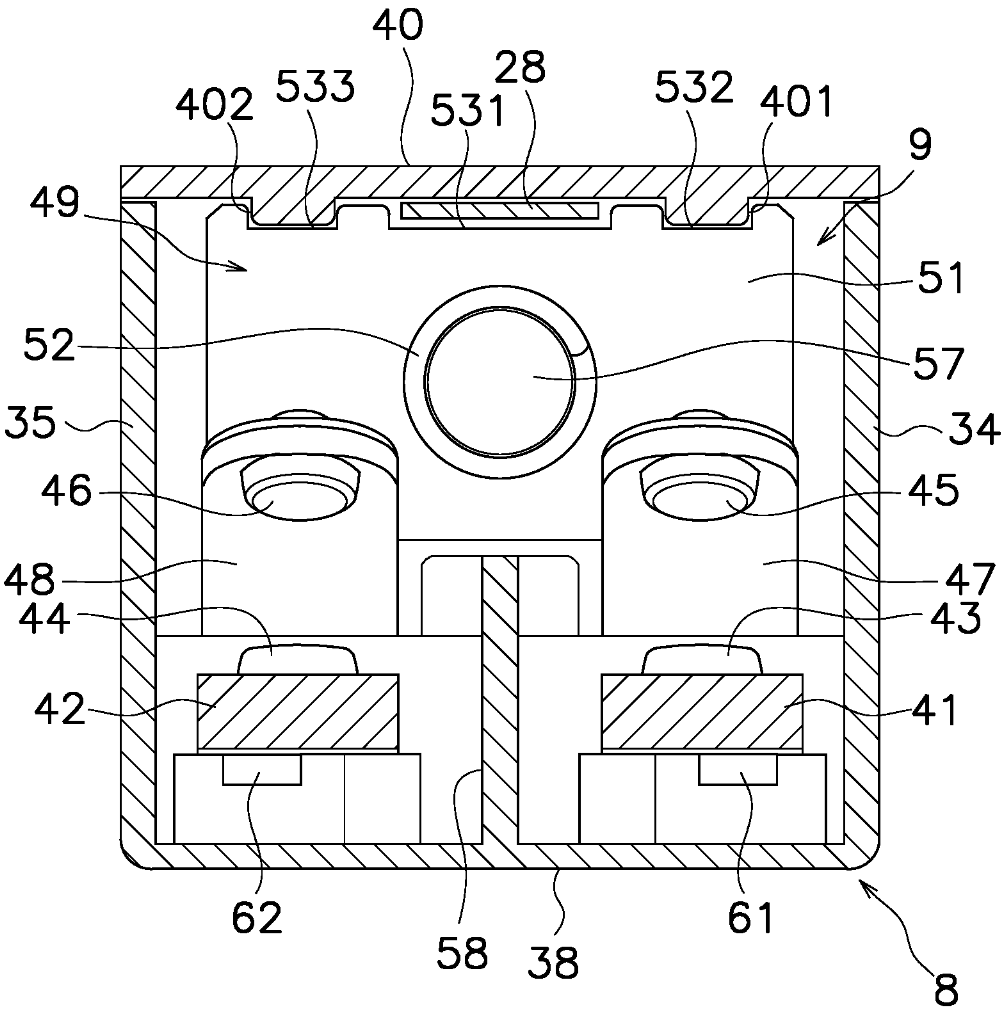
FIG. 13 is a cross-sectional view taken along line XIII-XIII in FIG. 12.

FIG. 12 is a top view showing the contact device 9 and the case 8 with the moving mechanism 49 omitted for clarity. FIG. 13 is a cross-sectional view taken along line XIII-XIII in FIG. 12. As shown in FIGS. 12 and 13, the case 8 includes a partition wall 58. The partition wall 58 protrudes upward from the bottom surface 38. The partition wall 58 is disposed between the first fixed terminal 41 and the second fixed terminal 42. The moving mechanism 49 is disposed above the partition wall 58. The return spring 52 is disposed above the partition wall 58. The plunger 51 moves over the partition wall 58.

The partition wall 58 extends in the front-rear direction. The partition wall 58 spans between the front surface 36 and the rear surface 37 of the case 8. As shown in FIG. 13, an upper end of the partition wall 58 is located above the first fixed terminal 41 and the second fixed terminal 42. The upper end of the partition wall 58 is located above the first fixed contact 43 and the second fixed contact 44. The upper end of the partition wall 58 is located below the plunger 51.

As shown in FIG. 12, the first fixed terminal 41 is disposed close to the first side surface 34. The second fixed terminal 42 is disposed close to the second side surface A distance D1 between the first fixed terminal 41 and the first side surface 34 is smaller than a distance D3 between the first fixed terminal 41 and the second fixed terminal 42. A distance D2 between the second fixed terminal 42 and the second side surface 35 is smaller than the distance D3 between the first fixed terminal 41 and the second fixed terminal 42. The distance D1 between the first fixed terminal 41 and the first side surface 34 is smaller than a distance D4 between the first fixed terminal 41 and the partition wall 58. The distance D2 between the second fixed terminal 42 and the second side surface 35 is smaller than a distance D5 between the second fixed terminal 42 and the partition wall 58.

Next, the connection operation and disconnection operation of the power connector 1 according to the present embodiment will be described. When the electric plug 2 is not inserted into the power outlet 3, the biasing force of the return spring 52 positions the plunger 51 at the first position shown in FIG. 8. In this state, the first pusher 54 presses the first base portion 472 of the first movable piece 47. Also, although not shown, the second pusher 55 presses the second base portion 482 of the second movable piece 48. Therefore, the first movable contact 45 is separated from the first fixed contact 43 and the second movable contact 46 is separated from the second fixed contact 44.

Figure 14:
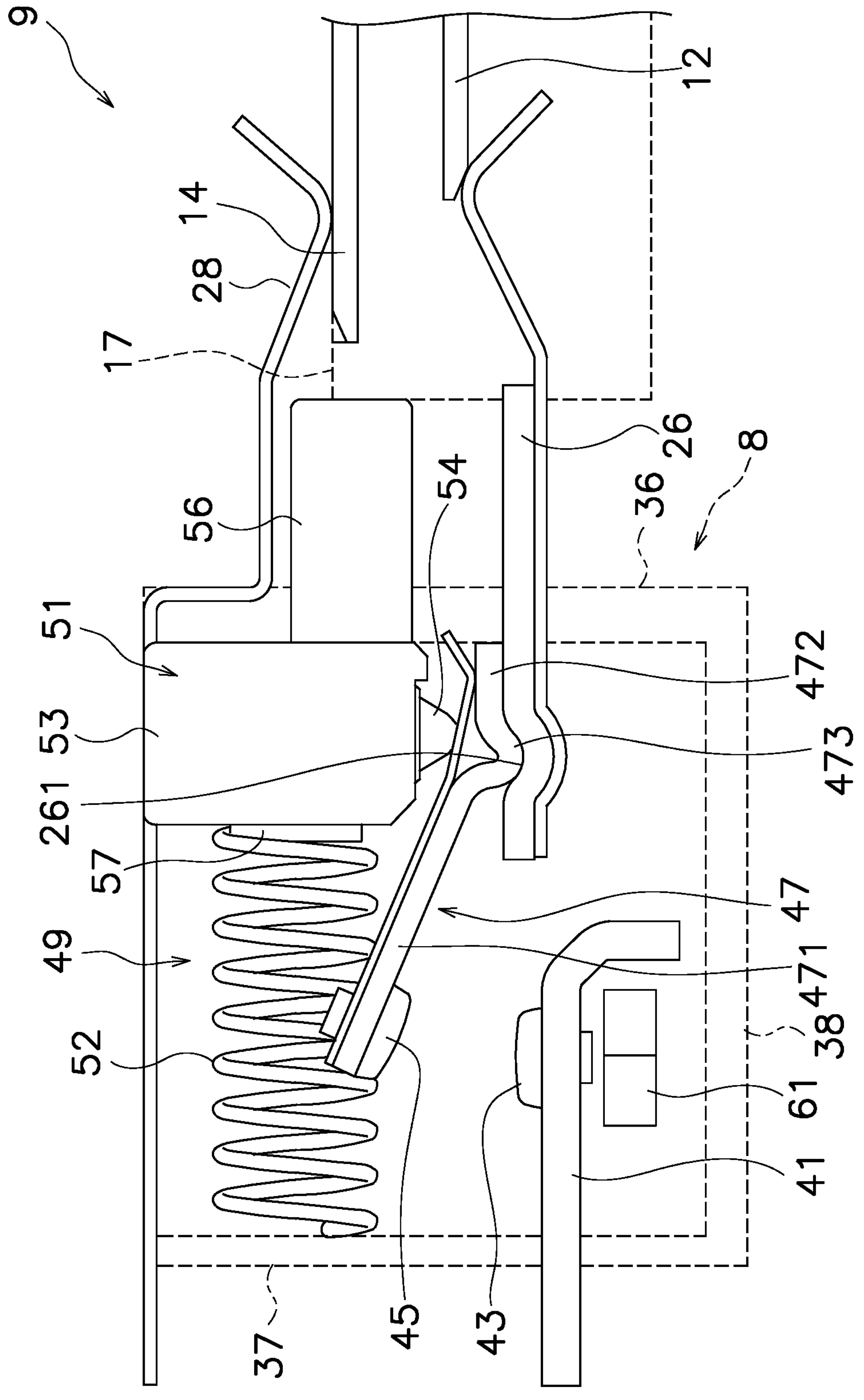
FIG. 14 is a side view of the contact device.

When the insert 6 of the electric plug 2 is inserted into the insertion port 21 of the power outlet 3, the first plug terminal 12 is inserted into the first insertion port 22 and the second plug terminal 13 is inserted into the second insertion port 23. Also, the plug ground terminal 14 is inserted into the third insertion port 24 and the pressing portion 17 is inserted into the third insertion port 24. As shown in FIG. 14, when the pressing portion 17 contacts the projection 56 of the plunger 51, the plug ground terminal 14 is in contact with the socket ground terminal 28. Also, the first plug terminal 12 is in contact with the first connection terminal 26 and the second plug terminal 13 is in contact with the second connection terminal 27. However, the first movable contact 45 is separated from the first fixed contact 43 and the second movable contact 46 is separated from the second fixed contact 44. Therefore, the first movable piece 47 and the first fixed terminal 41 are electrically disconnected. Also, the second movable piece 48 and the second fixed terminal 42 are electrically disconnected.

When the insert 6 of the electric plug 2 is further inserted into the insertion port 21 of the power outlet 3, the pressing portion 17 pushes the plunger 51 rearward to move the plunger 51 toward the second position against the biasing force of the return spring 52. Therefore, as shown in FIG. 10, the first pusher 54 moves from the first base portion 472 of the first movable piece 47 to the first tip portion 471. Thereby, the first pusher 54 pivots around the first fulcrum 473. Also, the second pusher 55 moves from the second base portion 482 of the second movable piece 48 to the second tip portion 481. Thereby, the second pusher 55 pivots around the second fulcrum 483. Then, when the plunger 51 reaches the second position, the first movable contact 45 contacts the first fixed contact 43 and the second movable contact 46 contacts the second fixed contact 44. Thereby, the first plug terminal 12 is electrically connected to the first fixed terminal 41 via the first movable piece 47. Also, the second plug terminal 13 is electrically connected to the second fixed terminal 42 via the second movable piece 48. The electric plug 2 is thereby electrically connected to the power outlet 3.

As described above, when the electric plug 2 is inserted into the power outlet 3, the first movable contact 45 contacts the first fixed contact 43 after the first plug terminal 12 contacts the first connection terminal 26. Also, the second movable contact 46 contacts the second fixed contact 44 after the second plug terminal 13 contacts the second connection terminal 27.

When the insert 6 of the electric plug 2 is pulled out from the insertion port 21 of the power outlet 3, the pressing portion 17 moves forward. Accordingly, the plunger 51 moves toward the first position by the biasing force of the return spring 52. Therefore, as shown in FIG. 14, the first pusher 54 moves from the first tip portion 471 of the first movable piece 47 to the first base portion 472. Thereby, the first pusher 54 pivots around the first fulcrum 473 in the opposite direction to when the plunger 51 moves toward the second position. Also, the second pusher 55 moves from the second tip portion 481 of the second movable piece 48 to the second base portion 482. Thereby, the second pusher pivots around the second fulcrum 483 in the opposite direction to when the plunger 51 moves toward the second position. Then, when the plunger 51 reaches the first position, the first movable contact 45 separates from the first fixed contact 43 and the second movable contact 46 separates from the second fixed contact 44. Thereby, the first movable piece 47 is electrically disconnected from the first fixed terminal 41. Also, the second movable piece 48 is electrically disconnected from the second fixed terminal 42.

When the pressing portion 17 moves further forward, the pressing portion 17 of the electric plug 2 separates from the projection 56 of the plunger 51. Also, the first plug terminal 12 separates from the first connection terminal 26 and the second plug terminal 13 separates from the second connection terminal 27. Thereby, the electric plug 2 is electrically disconnected from the power outlet 3. As described above, when the electric plug 2 is pulled out from the power outlet 3, the first plug terminal 12 separates from the first connection terminal 26 after the first movable contact 45 separates from the first fixed contact 43. Also, the second plug terminal 13 separates from the second connection terminal 27 after the second movable contact 46 separates from the second fixed contact 44.

As described above, in the power connector 1 according to the present embodiment, electrical connection and disconnection between the electric plug 2 and the power outlet 3 are switched by opening and closing the first and second movable contacts 45 and 46 and the first and second fixed contacts 43 and 44. Thereby, high electric power can be switched appropriately.

Further, in the power connector 1 according to the present aspect, the pressing portion 17 presses the plunger 51 according to the operation of inserting the electric plug 2 into the power outlet 3. The plunger 51 is thereby moved to the second position. Therefore, the electric plug 2 and the power outlet 3 can be electrically connected with a simple operation.

Next, a structure for extinguishing an arc in the contact device 9 according to the present embodiment will be described. As shown in FIG. 12, the contact device 9 includes a first magnet 61 and a second magnet 62. The first magnet 61 is disposed below the first fixed terminal 41. The first magnet 61 is disposed below the first fixed contact 43. As seen in the top view, the first magnet 61 overlaps the first fixed contact 43. The first magnet 61 has a rectangular parallelepiped shape. The second magnet 62 is disposed below the second fixed terminal 42. The second magnet 62 is disposed below the second fixed contact 44. The second magnet 62 overlaps the second fixed contact 44 as seen in the top view. The second magnet 62 has a rectangular parallelepiped shape.

Figure 15:
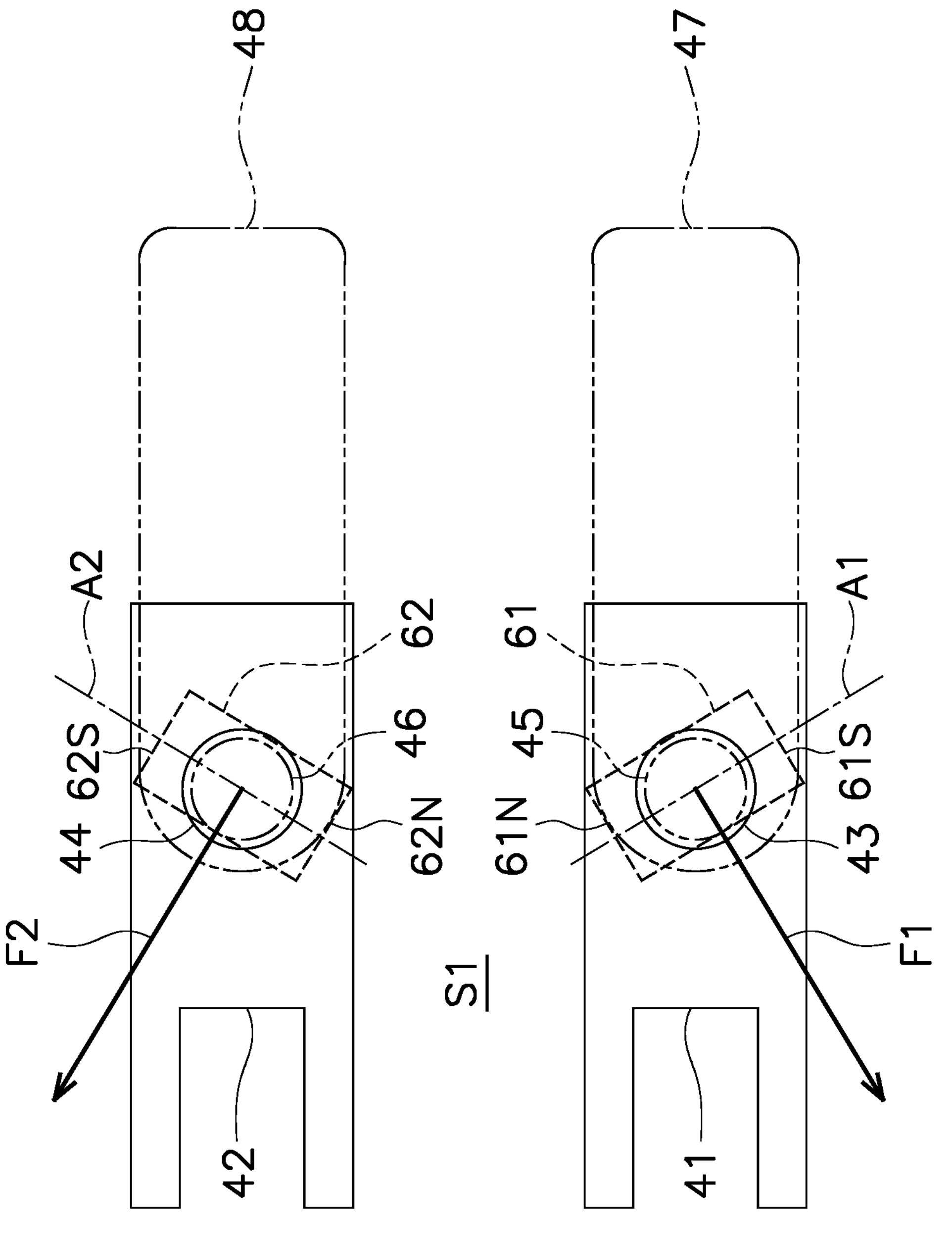
FIG. 15 is a schematic top view of the contact device showing an arrangement of a first magnet and a second magnet.

FIG. 15 is a schematic top view of the contact device 9 showing the arrangement of the first magnet 61 and the second magnet 62. As shown in FIG. 15, the first magnet 61 has a first axis A1. The first axis A1 is a virtual line connecting the N pole 61N and the S pole 61S of the first magnet 61. The first axis A1 is inclined with respect to the front-rear direction and the left-right direction. The second magnet 62 has a second axis A2. The second axis A2 is a virtual line connecting the N pole 62N and the S pole 62S of the second magnet 62. The second axis A2 is inclined with respect to the front-rear direction and the left-right direction. The second axis A2 is inclined symmetrically with the first axis A1.

The first magnet 61 generates a magnetic field that applies a first Lorentz force F1 in a first oblique direction to an arc generated between the first fixed contact 43 and the first movable contact 45. The first oblique direction is a direction inclined with respect to the front-rear direction and away from the second fixed terminal 42. Specifically, the first magnet 61 generates the first Lorentz force F1 directed rearward and outward in the left-right direction.

The second magnet 62 generates a magnetic field that applies a second Lorentz force F2 in a second oblique direction to an arc generated at the second fixed contact 44 and the second movable contact 46. The second oblique direction is a direction inclined with respect to the front-rear direction and away from the first fixed terminal 41. The second magnet 62 generates the second Lorentz force F2 directed rearward and outward in the left-right direction.

As described above, in the contact device 9 according to the present embodiment, The Lorentz forces act on the arcs in the directions away from the space S1 (hereinafter referred to as the central space) between the first fixed terminal 41 and the second fixed terminal 42, respectively. Therefore, even if an airflow flowing toward the central space S1 is generated due to the temperature difference due to the heat of the arc, the movement of the arc toward the central space S1 is suppressed. Thereby, occurrence of a short circuit between the first fixed terminal 41 and the second fixed terminal 42 is suppressed. Also, the first oblique direction and the second oblique direction are inclined with respect to the front-rear direction. Therefore, it is possible to extend the arcs using the space along the first fixed contact 43 and the space along the second fixed contact 44 compared with the case where the first and second Lorentz forces F1 and F2 act outward in the left-right direction respectively. Thereby, the arc can be extinguished effectively. In addition, although the first side surface 34 and the second side surface 35 are disposed close to the first fixed terminal 41 and the second fixed terminal 42, the arc is obliquely extended, so that damage to the first side surface 34 and the second side surface 35 is suppressed. Thereby, the enlargement of the contact device 9 is suppressed.

Although one embodiment of the present invention has been described above, the present invention is not limited to the above-described embodiment, and various modifications are possible without departing from the gist of the invention.

The contact device 9 may be mounted not only on a power connector, but also on a relay, switch, or the like. The structure of the moving mechanism 49 is not limited to that of the above embodiment, and may be modified. For example, the moving mechanism 49 may move the first movable piece 47 and the second movable piece 48 by magnetic force generated by a coil. The shape or movement of the plunger 51 may be changed. The structure of the return spring 52 may be changed. The first movable piece 47 and the second movable piece 48 are not limited to the seesaw-type pivoting movement structure as described above, and may be changed. For example, the first movable piece 47 and the second movable piece 48 may move linearly. Alternatively, the first movable piece 47 and the second movable piece 48 may move by elastic deformation.

Before the pressing portion 17 contacts the projection 56 of the plunger 51, the plug ground terminal 14 may contact the socket ground terminal 28, the first plug terminal 12 may contact the first connection terminal 26, and the second plug terminal 13 may contact the second connection terminal 27. Alternatively, after the pressing portion 17 contacts the projection 56 of the plunger 51, the plug ground terminal 14 may contact the socket ground terminal 28, the first plug terminal 12 may contact the first connection terminal 26, and the second plug terminal 13 may contact the second connection terminal 27.

The structure of the magnet is not limited to that of the above embodiment, and may be modified. The structure of the case 8 is not limited to that of the above embodiment, and may be modified. For example, the partition wall 58 may be omitted.

Figure 16:
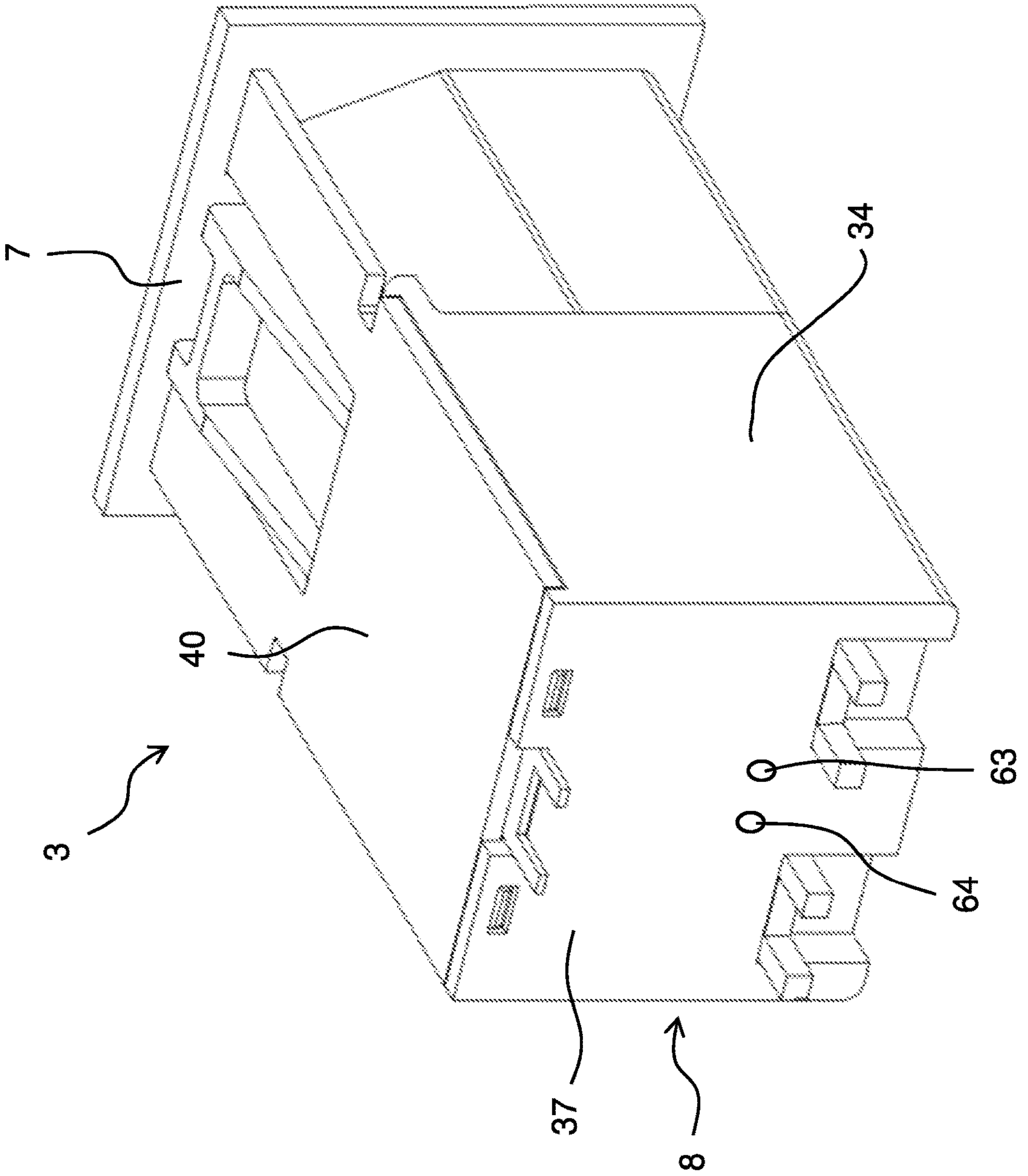
FIG. 16 is a perspective view of the power outlet according to a modification.
Figure 17:
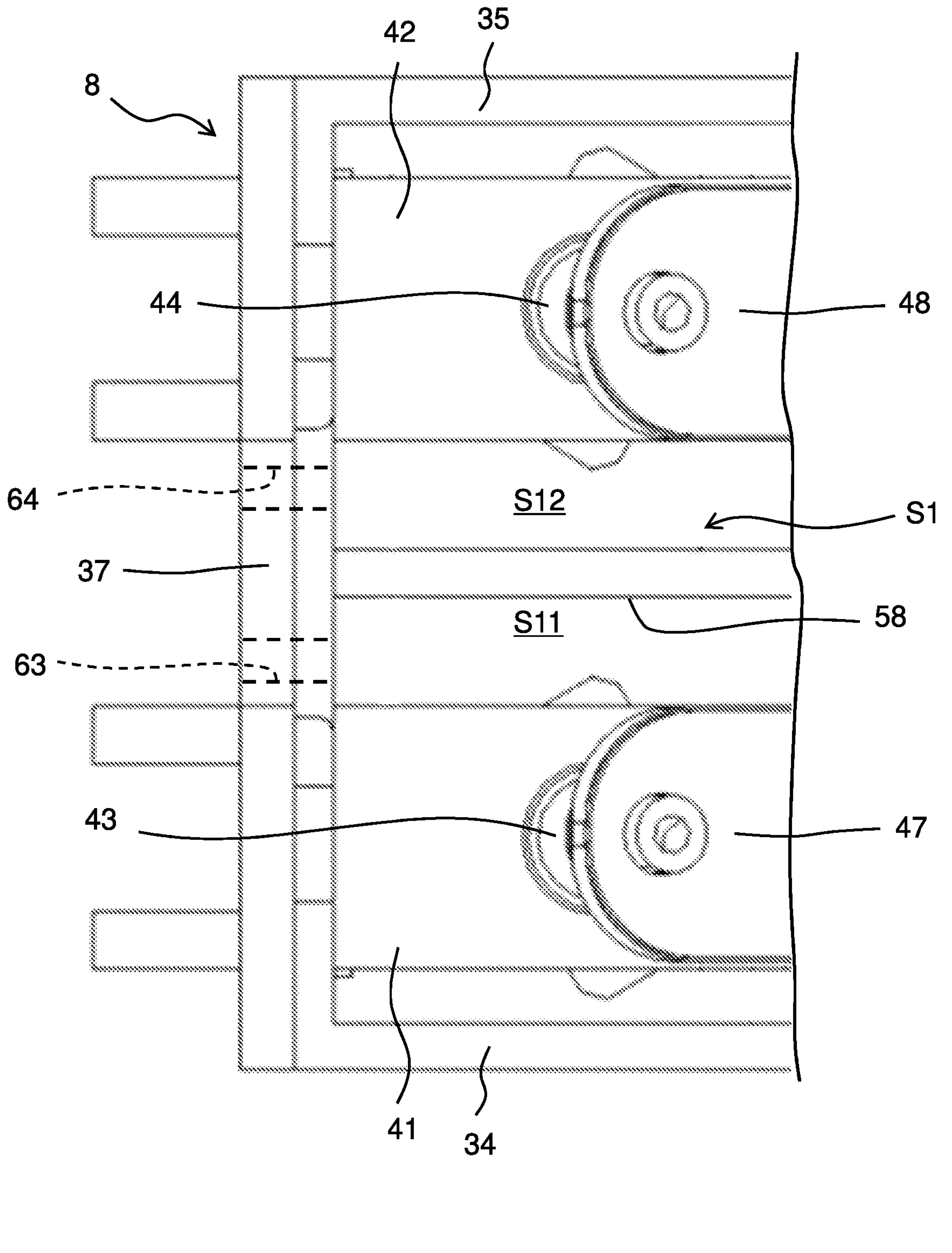
FIG. 17 is a top view of the contact device of the power outlet according to the modification.

FIG. 16 is a perspective view showing the power outlet 3 according to a modification. FIG. 17 is a top view of the contact device 9 of the power outlet 3 according to the modification. As shown in FIGS. 16 and 17, the case 8 may include air holes 63 and 64 disposed facing the central space S1. The air holes 63 and 64 may communicate the outside of the case 8 and the central space S1. The air holes 63 and 64 may be provided in the rear surface 37 of the case 8. The air holes 63 and 64 may include a first hole 63 and a second hole 64. The first hole 63 may be disposed to face a first central space S11 between the first fixed terminal 41 and the partition wall 58. The second hole 64 may be disposed to face a second central space S12 between the second fixed terminal 42 and the partition wall 58. In this case, even if the air in the first and second central spaces S11 and S12 is warmed by the arc, the air can escape to the outside of the case 8 through the first hole 63 and the second hole 64. This suppresses the movement of the arc toward the central space S1.

REFERENCE SIGNS LIST

7 Socket
8 Case
9 Contact device
22 First insertion port
23 Second insertion port
26 First connection terminal
27 Second connection terminal
41 First fixed terminal
42 Second fixed terminal
43 First fixed contact
44 Second fixed contact
45 First movable contact
46 Second movable contact
47 First movable piece
48 Second movable piece
49 Moving mechanism
58 Partition wall
61 First magnet
62 Second magnet
63, 64 Air hole
A1 First axis
A2 Second axis
F1 First Lorentz force
F2 Second Lorentz force

The invention claimed is:

1. A contact device comprising:
- a first fixed terminal extending in a first direction;
- a first fixed contact connected to the first fixed terminal;
- a second fixed terminal extending in the first direction, the second fixed terminal being disposed apart from the first fixed terminal in a second direction perpendicular to the first direction;
- a second fixed contact connected to the second fixed terminal;
- a first movable contact facing the first fixed contact;
- a first movable piece connected to the first movable contact;
- a second movable contact facing the second fixed contact;
- a second movable piece connected to the second movable contact, the second movable piece being disposed apart from the first movable piece in the second direction;
- a moving mechanism configured to move the first movable piece and the second movable piece;
- a first magnet configured to generate a first magnetic field to apply a first Lorentz force in a first oblique direction to a first arc generated at the first fixed contact and the first movable contact, the first oblique direction being a direction inclined with respect to the first direction and oriented away from the second fixed terminal; and a second magnet configured to generate a second magnetic field to apply a second Lorentz force in a second oblique direction to a second arc generated at the second fixed contact and the second movable contact, the second oblique direction being a direction inclined with respect to the first direction and oriented away from the first fixed terminal.

2. The contact device according to claim 1, further comprising:

a partition wall disposed between the first fixed terminal and the second fixed terminal.

3. The contact device according to claim 2, wherein the first movable contact is disposed above the first fixed contact, the second movable contact is disposed above the second fixed contact, and the moving mechanism is disposed above the partition wall.

4. The contact device according to claim 1, further comprising:

a case that accommodates the first fixed terminal and the second fixed terminal, wherein the case includes an air hole disposed facing a space between the first fixed terminal and the second fixed terminal.

5. The contact device according to claim 1, wherein the first magnet has a first axis connecting north and south poles of the first magnet, the first axis is inclined with respect to the first direction and the second direction, the second magnet has a second axis connecting north and south poles of the second magnet, and the second axis is symmetrically inclined with respect to the first axis.

6. A power outlet comprising:

the contact device according to claim 1;

a socket including a first insertion port and a second insertion port;

a first connection terminal disposed in the first insertion port, the first connection terminal being connected to the first movable piece; and a second connection terminal disposed in the second insertion port, the second connection terminal being connected to the second movable piece.

* * * * *